United States Patent [19]

Israelson

[11] Patent Number: 4,692,176

[45] Date of Patent: Sep. 8, 1987

[54] THERMAL EXPANSION COMPENSATING BACK FLUSH MANIFOLD

[75] Inventor: Gordon A. Israelson, Murrysville, Pa.

[73] Assignee: Westinghouse Electric Corp., Pittsburgh, Pa.

[21] Appl. No.: 816,783

[22] Filed: Jan. 7, 1986

[51] Int. Cl.$^4$ .............................................. B01D 29/32
[52] U.S. Cl. ....................................... 55/302; 55/523; 285/905
[58] Field of Search ................. 55/267, 302, 435, 523; 165/81, 83; 285/224, 905

[56] References Cited

U.S. PATENT DOCUMENTS

| | | | |
|---|---|---|---|
| 3,254,476 | 6/1966 | Kusek et al. | 55/267 |
| 3,273,320 | 9/1966 | Delaune et al. | 55/435 X |
| 3,535,852 | 10/1970 | Hirs | 55/302 |
| 3,746,374 | 7/1973 | Sedgwick et al. | 285/905 X |
| 3,835,920 | 9/1974 | Mondt | 165/81 |
| 4,133,657 | 1/1979 | Krogsrud | 55/302 X |
| 4,208,270 | 6/1980 | Grieve et al. | 55/267 X |
| 4,299,414 | 11/1981 | Bachmann | 285/224 X |
| 4,302,228 | 11/1981 | Ritter | 55/302 |
| 4,328,860 | 5/1982 | Hoffmüller | 165/81 |
| 4,342,574 | 8/1982 | Fetzer | 55/523 X |
| 4,398,931 | 8/1983 | Shevlin | 55/302 X |
| 4,438,956 | 3/1984 | Jones et al. | 285/905 X |
| 4,479,817 | 10/1984 | Steever et al. | 55/267 |
| 4,505,051 | 3/1985 | Herchenbach et al. | 55/267 X |

FOREIGN PATENT DOCUMENTS

1118393 10/1984 U.S.S.R. .................. 55/267

*Primary Examiner*—Robert Spitzer
*Attorney, Agent, or Firm*—Daniel C. Abeles

[57] ABSTRACT

Thermal expansion compensating arrangement including a vessel and a first member anchored to the vessel so that it can thermally expand uniformly radially outwardly in a given direction from a longitudinal axis of the vessel. A second member is disposed in the vessel with a desired alignment in the given direction relative to the first member at a base temperature, the second member being made of the same material as the first member. An anchoring arm is provided for anchoring the second member to the vessel. The anchoring arm has one end which forms a rigid connection with the vessel and another end which forms a rigid connection with the second member. The anchoring arm is made of material having a coefficient of thermal expansion for causing the anchoring arm to expand away from its rigid connection with the vessel while the second member thermally expands away from the rigid connection with the anchoring arm. The coefficients of thermal expansion and anchoring arm length are selected based upon a predetermined relationship for causing the thermal expansion of the anchoring arm to compensate for the thermal expansion of the second member so that upon an increase in temperature from the base temperature the second member will thermally expand uniformly radially outwardly from the longitudinal axis to thereby maintain the desired alignment with the first member.

19 Claims, 4 Drawing Figures

THERMAL EXPANSION COMPENSATING BACK FLUSH MANIFOLD

BACKGROUND OF THE INVENTION

1. Field of the Invention

This invention relates to an arrangement and method for compensating for thermal expansion of two members in order to maintain the alignment of one member relative to the other member in the direction of thermal expansion, where the members have the same coefficient of thermal expansion but have different effective anchor points relative to a supporting third body so that, without compensation for thermal expansion, an increase in temperature of the two members would cause them to expand in a manner which would move them out of alignment. The invention particularly concerns a hot gas filtration system and an arrangement and method for compensating for thermal expansion of a back flush manifold relative to a filter mounting plate, both of which are disposed in a conduit, or vessel, for the passage of high temperature gases, wherein the filter mounting plate and the back flush manifold each have different effective anchoring points with respect to the conduit, so that upon an increase in temperature the effects of an uncompensated thermal expansion result in a misalignment between the filter mounting plate and the back flush manifold.

DECRIPTION OF THE PRIOR ART

Modern industry has a need for high efficiency filtering of combustion gases at high temperatures. Any type of power plant that burns a solid fuel or a petroleum base fuel produces a combustion gas which contains particulates such as ash. Not only have governmental regulations on permissible emissions become more stringent for public health considerations, but also there are valid technical reasons for minimizing the particulate content of combustion gases. The particulates contained in the combustion gas enhance corrosion and therefore the removal of particulates can, for example, prolong the life of turbine blades in combustion turbine-generator systems or minimize the fouling of heat exchange surfaces of boiler tubes in cogeneration plants. To avoid these problems, it is necessary to filter the hot gases before they reach the turbine blades in a turbine generator system or the heat exchange surfaces in the boiler of a cogeneration plant.

In recent years, various hot gas filtration systems have been developed as an alternative to the conventional cyclone filter for the control of particulates in high temperature combustion gases. One such filtration system comprises a metal plate containing a plurality of spaced openings, with a rigid sintered silicon carbide filter element mounted in each of the openings. The metal plate, referred to as a tubesheet, and the filter elements are mounted in a refractory lined carbon steel pressure vessel to form a physical boundary between one portion of the vessel and another. Hot combustion gases enter the vessel and must pass through the filter elements in order to exit the vessel. Particulates build up on the exterior of the filter elements and form a filtrate cake. As the cake thickness increases, the pressure drop across the tubesheet increases and gas flow through the filter decreases.

Periodic backflushing of the filter elements to blow the cake off the exterior surfaces of the filter elements is accomplished by sending a high pressure pulse of air, filtered gas or inert gas into a back flush manifold which has a plurality of orifices centered over the openings in the tubesheet, at which the outlets of the filter elements are disposed. In order that the backflushing be effective, it is necessary that the orifices of the back flush manifold remain aligned with the openings in the tubesheet when, for example, the ambient temperature within the vessel is raised from room temperature (21° C.) to the temperature of the hot combustion gas in the range of 760° C. to 1093° C.

In the above described system, the tubesheet is centered in the vessel by a flexible support which permits the tubesheet to thermally expand. For example a 1.91 m diameter tubesheet will grow about 2.5 cm in diameter when its temperature is raised from 21° C. to 899° C. The flexible tubesheet support permits the tubesheet to grow with respect to the vessel wall and at the same time to stay centered within the vessel. That is, the tubesheet expands uniformly radially with respect to the center line of the vessel. The tubesheet thus expands as if it were anchored at the center of the vessel, since it grows uniformly in all directions from the center.

The diameter of the vessel wall will also increase, but by a much smaller amount. The refractory lining of the vessel serves as thermal insulation, separating the hot gas interior from the vessel wall such that the exterior of the vessel is at a temperature of 93° C. to 149° C. when the temperature of the hot combustion gases is 760° C. to 1093° C. Thus, when the temperature of the combustion gas is raised from 21° C. to 899° C., the temperature of the vessel will increase from 21° C. to only 121° C., and for example, a 2.54 m diameter vessel wall will only grow about 0.5 cm with such a temperature increase.

The back flush manifold is made of the same material as the tubesheet and therefore thermally expands at the same rate as the tubesheet upon an increase in temperature. The orifices of the back flush manifold will not necessarily remain aligned with the openings in the tubesheet after thermal expansion, however, because the back flush manifold is anchored to the vessel wall in a different manner than the tubesheet, and, unless precautions are taken, the manifold does not uniformly expand with respect to the center line of the vessel. This problem results from the fact that the back flush gas must be piped in from a high pressure source of gas which is external to the vessel. The vessel has a penetration in its wall through which the pulses of back flush gas are piped into the manifold. If the supply pipe for the back flush gas is both rigidly attached to the vessel wall and to the near end of the back flush manifold, the thermal expansion of the supply pipe and the back flush manifold would cause the manifold to grow lengthwise from one wall of the vessel towards the other wall, so that the back flush orifices would no longer be aligned with the openings in the tubesheet.

In order to overcome this problem, the back flush manifold could be rigidly attached to the tubesheet, centering its orifices over the openings in the tubesheet. In this case, however, the supply pipe cannot be rigidly attached to the vessel, because the differential thermal expansion between the tubesheet and the combination of the manifold and its supply pipe could cause excessive compressive loads in the manifold, causing the manifold to bend and a misalignment of the back flush orifices. Thus, in this method of rigidly connecting the manifold to the tubesheet, compensation for thermal expansion has been accomplished by attaching the manifold supply pipe to the vessel with a flexible bellows or expansion compensating device. This method has experienced failures at high stress areas in the thin wall bellows due to stress corrosion or fatigue cracking in the expansion compensating device. Further, other problems have been experienced in effecting the pressure seal between the bellows and the supply pipe.

SUMMARY OF THE INVENTION

It is an object of the invention to provide an arrangement and method for compensating for thermal expansion of two members which have different effective anchoring points with respect to an anchoring body to maintain the alignment of the two members in the direction of expansion.

It is a further object of the invention to provide an arrangment and method for compensating for thermal expansion of a member which is rigidly connected to a supporting body via an anchoring arm in order to maintain the alignment of the member with respect to a given longitudinal axis.

It is a more particular object of the invention to provide an arrangement and method for compensating for the thermal expansion of a back flush manifold and a tubesheet which have different effective anchoring points within a vessel, for maintaining the alignment of the orifices in the back flush manifold with respect to the openings in the tubesheet when hot combustion gases are passed through the vessel.

The above and other objects are accomplished in accordance with the invention by the provision of a thermal expansion compensating arrangement including:

a vessel having a longitudinal axis;

a first member disposed in the vessel, intersecting the longitudinal axis and made of a material having a first coefficient of thermal expansion causing the first member to thermally expand along a given direction transverse to the longitudinal axis upon an increase in temperature;

anchoring means for anchoring the first member to the vessel so that the first member can thermally expand uniformly radially outwardly from the longitudinal axis in thg given direction;

a second member having a desired alignment in the given direction relative to the first member at a base temperature, the second member being made of the same material as the first member, the second member thermally expanding along the given direction upon an increase in temperature; and an anchoring arm for anchoring the second member to the vessel, the anchoring arm having one end which forms a rigid connection with the vessel and another end which forms a rigid connection with the second member, the anchoring arm being made of material having a second coefficient of thermal expansion for causing the anchoring arm to expand along the given direction upon an increase in temperature, the anchoring arm thermally expanding away from its rigid connection with the vessel and the second member thermally expanding away from the rigid connection with the anchoring arm, the material for the first and second members and the material for and length of the anchoring arm being selected based upon a predetermined relationship of the length of the anchoring arm with the first and second coefficients of thermal expansion for causing the thermal expansion of the anchoring arm to compensate for the thermal expansion of the second member to produce an effective anchoring point of the second member which is coincident with the longitudinal axis of the vessel so that upon an increase in temperature above the base temperature the second member will thermally expand uniformly radially outwardly from the longitudinal axis to thereby maintain the desired alignment with the first member.

According to another aspect of the invention a thermal expansion compensating arrangement is provided, including:

a supporting body having a longitudinal axis;

a member made of a material having a first coefficient of thermal expansion for causing the member to thermally expand along a given direction upon an increase in temperature; and an anchoring arm made of a material having a second coefficient of thermal expansion, the anchoring arm having one end forming a rigid connection with the supporting body and another end forming a rigid connection with the member, the longitudinal axis being perpendicular to both the anchoring arm and the member and intersecting the member at a given point at a base temperature, and the materials for the member and the anchoring arm and the length of the anchoring arm being selected based upon a predetermined relationship of the length of the anchoring arm with the first and second coefficients of thermal expansion for maintaining the intersection of the longitudinal axis with the member at the given point upon an increase in temperature above the base temperature.

In accordance with a further aspect of the invention, a method is provided for compensating for thermal expansion of first and second members mounted in a vessel having a longitudinal axis to maintain a desired alignment of the first member relative to the second member in a given direction of thermal expansion transverse to the longitudinal axis upon an increase in temperature within the vessel, where the members are made of the same material having a first coefficient of thermal expansion in the given direction and the first member is anchored to the vessel so that it thermally expands uniformly radially outwardly from the longitudinal axis of the vessel upon an increase in temperature from a base temperature, the longitudinal axis intersecting the second member at a given point at the base temperature, said method comprising:

providing an anchoring arm having one end rigidly connected to the vessel, and another end rigidly connected to the second member, the anchoring arm being made of a material having a second coefficient of thermal expansion; and selecting the material for the first and second members and the material for and length of the anchoring arm based upon a predetermined relationship of the length of the anchoring arm with the first and second coefficients of thermal expansion for creating an effective anchoring point of the second member at the given point so that thermal expansion of the second member occurs uniformly radially outwardly from the longitudinal axis upon an increase in temperature, thereby maintaining the desired alignment with the first member.

According to more particular features of the invention, the first member comprises a tubesheet which supports filter elements in the vessel and the tubesheet is mounted to the vessel by a flexible circumferencial support which permits the tubesheet to thermally expand outwardly from the center line of the vessel. The second member comprises a back flush manifold having a plurality of orifices aligned with the outlets of the filter elements supported by the tubesheet for delivering high pressure pulses of air, inert gas or other suitable gas into the outlet openings of the filter elements for back-flushing the filter elements. A supply pipe has one end rigidly connected to the vessel, for example by welding, and the other end rigidly connected to the back flush manifold. The pipe is connected via a penetration in the vessel wall to a source of high pressure back flush gas.

The arrangement and method according to the invention have the advantage that the materials of the tubesheet and the back flush manifold assembly are permitted to thermally expand free of any constraints, thereby eliminating bending and buckling of the components.

The particulates contained in the hot combustion gases which pass through the vessel containing the foregoing filter arrangement create a corrosive environment. By eliminating stress due to thermal expansion in the tubesheet, back flush manifold and its supply pipe, problems associated with "stress corrosion cracking", which occurs when a material is stressed in a corrosive environment, are also eliminated.

Further, allowing the tubesheet and back flush manifold to freely expand thermally, minimizes permanent deformation due to high temperature creep which also occurs when materials are placed under stress in a high temperature environment. High temperature creep could otherwise result in a misalignment of the back flush orifices with respect to openings in the tubesheet over a period of time.

An additional advantage of the arrangement and method according to the invention is that because the pipe connecting the back flush manifold to the vessel wall is rigidly fixed to the vessel wall, for example by welding, there is a positive gas seal between the pipe and the vessel wall. This is a particular improvement over the prior technique wherein the back flush manifold was rigidly fixed to the tubesheet and connected to the vessel wall via an expansion bellows or other type of expansion joint in order to eliminate the stresses due to thermal expansion. In these latter arrangements, the expansion bellows or other type of expansion joint were subject to failure, thereby resulting in leaks of the combustion gases to the exterior of the vessel.

DESCRIPTION OF THE PREFERRED EMBODIMENT

Figure 1:
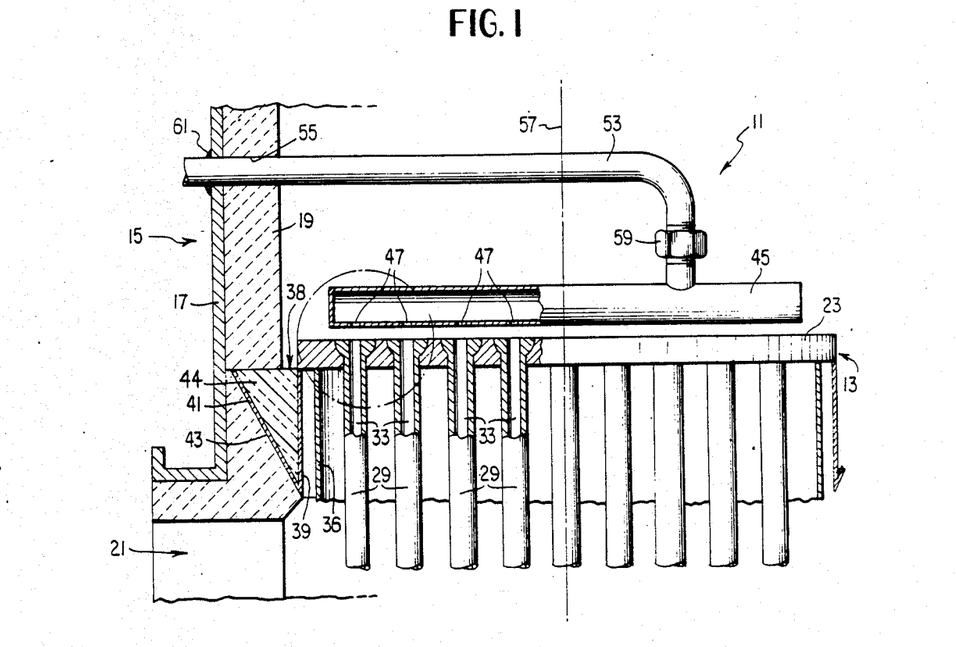
FIG. 1 is a partial cross sectional view of a vessel containing a filter assembly and back flush manifold assembly according to one embodiment of the invention.

FIG. 1 is a simplified sectional view illustrating one embodiment of a thermal expansion compensating back flush manifold assembly 11 incorporating the principles according to the invention. Back flush manifold assembly 11 is mounted above a filter assembly 13 within a vessel, wherein only a portion of the vessel wall 15 is illustrated in FIG. 1.

The vessel wall 15 comprises an outer sheath 17 of carbon steel which has an inner lining 19 composed of a suitable insulating refractory material, the type and thickness of which may be selected to meet thermal loss requirements in a given situation. A gas inlet 21 (partially shown) is defined in vessel wall 15 through which high temperature combustion gases enter the vessel and pass upwardly through filter assembly 13 and then exit the vessel through a gas outlet (not shown). In a typical operation the gas may have a temperature in the range of 760° C. to 1093° C. and a pressure in the range of 10.5 to 12 bar. The refractory lining 19 serves as thermal insulation, separating the hot gas interior from the outer steel sheath 17 of the vessel so that the exterior of the vessel is maintained at a temperature of 193° C. to 149° C. during operation. The combustion gases entering the vessel via inlet 21 contain ash and other particulates which must be removed by filter assembly 13 prior to exiting the vessel.

Figure 2:
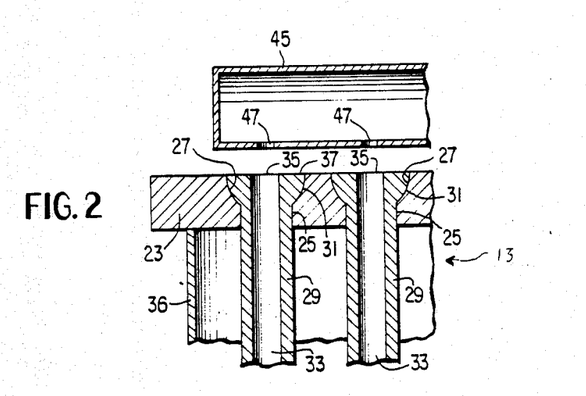
FIG. 2 is an enlarged view of the portion of FIG. 1 within the dot-dash circle.

Referring also to FIG. 2, filter assembly 13 comprises a tubesheet 23 which is a circular metal plate having openings 25 each of which present a conical recess 27 for supporting a sintered silicon carbide filter 29 which has a correspondly shaped conical portion 31 at its upper end which is seated in the conical recess 27. Each of the sintered silicon centered carbide filter elements 29 has a central passage 33 which communicates with a filter opening 35 located in an exposed face 37 of the conical portion 31. The sintered silicon carbide filter elements 29 are commercially available, for example from the Schumacher Company of the Federal Republic of Germany as Part Nos. Schumacel HTHP 60/40 mm diameter., 1500 mm long. A perforated shroud 36 integral with tubesheet 23 surrounds the filter elements 29 to evenly distribute the incoming combustion gases through the filter elements.

In a typical filter assembly of this type the the openings 25 may form an overall rectangular pattern, with each opening having a suitable diameter and center to center spacing with respect to another openings depending upon the particular design requirements of the filter assembly.

Tubesheet 23 is supported at vessel wall 15 by a flexible support 38 which is comprised of a cylindrical skirt 39 attached at its upper end to the outer circumference of the tubesheet, and a conical section 41 which is connected to the lower end of cylindrical skirt 39. Conical section 41 rests on a corresponding conical section 43 of flexible insulation formed in the vessel wall 15. The flexible support comprised of cylindrical skirt 39 and conical section 41 is made of the same material as tubesheet 23 which may be a nickel, chromium, iron, silicon type alloy identified as alloy 333 by the American Society of Testing and Materials (ASTM), under ASTM specifications B-723 and B-722. This alloy is available from Rolled Alloys Incorporated of Detroit, Mich., under their trademark RA333. A suitable compressible insulating material 44 may be placed between cylindrical skirt 39 and conical section 43, and again between the two conical sections 41 and 43, this latter insulation not being shown in FIG. 1.

The filter assembly comprised of tubesheet 23, filter elements 29 and flexible support 38 which goes around the tubesheet form a physical barrier between the dirty combustion gases entering the vessel via inlet 21 and the clean gas which passes through filter assembly 13 into the upper portion of the vessel above the tubesheet. The combustion gases thus pass through silicon carbide filter elements 29, travel up through passages 33 and out outlets 35 into the upper portion of the vessel, while depositing particulates contained in the gas on the exterior of the filter elements. Over a period of time the particulates form a cake on the exterior of the filter elements, impeding the flow of combustion gases through filter assembly 13. Accordingly, the cake must be periodically removed and this is accomplished by backflushing the filter elements with the use of the back flush manifold assembly 11.

The back flush manifold assembly 11 comprises a plurality of back flush manifold pipes 45, only one of which is shown in cross section in FIG. 1. Each back flush manifold pipe 45 is sealed at both ends and has a plurality of orifices 47 along its length. Preferably, a nozzle depends from each orifice and extends slightly into opening 35, although for clarity such nozzles are not shown. Each back flush manifold pipe is positioned so that its orifices 47 and corresponding nozzles are each aligned with a respective one of the filter outlets 35 in a given row of such outlets in the tubesheet 23. A supply pipe 53 passes through a penetration 55 in vessel wall 15 and extends beyond the center line 57 of the vessel and tubesheet 23 after which it incurs a 90° bend and is connected with the back flush manifold pipe 45 via a suitable pipe coupling 59. Supply pipe 53 is rigidly connected to the vessel wall by, for example, a weld joint 61 and communicates with a high pressure supply (not shown) of a suitable gas via appropriate control valves (not shown) for controlling the production of back flush pulses through the back flush manifold assembly. Normally, a plurality of supply pipes 53 will extend through vessel wall 15, each being connected to a respective one of the back flush manifold pipes 45 in the samemanner as shown in FIG. 1. The number of supply pipes 53 and back flush manifold pipes 45 is a matter of design, depending upon the number and arrangement of filter outlets 35 at the surface of tubesheet 23.

The tubesheet 23 and back flush manifold pipes 45 are made of the same material and therefore have the same coefficient of thermal expansion. When hot combustion gases are vented through the vessel, tubesheet 23, back flush manifold assembly 11 and vessel wall 15 will be subjected to the elevated temperatures of the combustion gas. Tubesheet 23 will expand uniformly radially outwardly from the center line 57 of the vessel due to the annular flexible support 38 connecting tubesheet 23 to the vessel wall 15. Tubesheet 23 expands as if it were anchored at the center line 57 of the vessel. The intersection of center line 57 with the tubesheet 23 therefore may be referred to as the effective anchoring point of the tubesheet.

The back flush manifold pipe 45, being made of the same material as the tubesheet 23, thermally expands at the same rate at the tubesheet. However, back flush manifold pipe 45 will not necessarily expand uniformly radially from the center line of the vessel so as to maintain orifices 47 in alignment with outlets 35 because back flush manifold pipe 45 is rigidly connected to a single point of the vessel wall by pipe 53. For example, if in FIG. 1 supply pipe 53 were connected to the left end of back flush manifold pipe 45, upon thermal expansion, back flush manifold pipe 45 would grow toward the right away from the rigid connection at vessel wall 15 which would result in a misalignment of orifices 47 with outlets 45. This problem is overcome according to the present invention by selecting the materials for the supply pipe, and for the manifold pipe and tubesheet so that the coefficients of thermal expansion of these materials satisfy a certain mathematical relationship as developed below, and by connenting the supply pipe to the back flush manifold pipe to take advantage of the differential thermal expansion between the supply pipe and back flush manifold pipe in a manner which maintains the alignment of the orifices 47 with the outlets 35. In effect, the arrangement and method of the invention shift the effective anchoring point of the back flush manifold pipe from the vessel wall to the center line of the vessel so that the back flush manifold pipe appears to expand uniformly radially outwardly from the center line 57 of the vessel.

Figure 3:
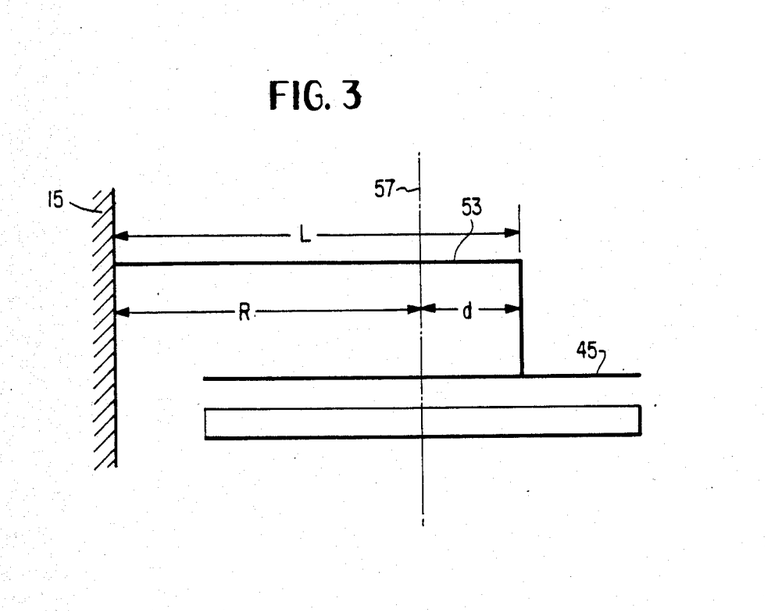
FIG. 3 is a schematic corresponding to FIG. 1 illustrating various dimensions used to explain the invention.

FIG. 3 is a simplified sketch of the arrangement shown in FIG. 1 and illustrates various dimensions which are useful in explaining the theory of the invention. In FIG. 3, L is the length of the supply pipe 53 from the inner surface of vessel wall 15, to a point corresponding with the connection of the supply pipe 53 to the back flush manifold pipe 45; R is the radius of the vessel, the center axis 57 of the vessel corresponding to the center of tubesheet 23; and d corresponds to the extension of supply pipe 53 beyond the center line 57 so that $d = L - R$.

In the following discussion it is assumed that supply pipe 53 is made of a material A having a coefficient of thermal expansion $E_A$ and that tubesheet 23 and back flush manifold pipe 45 are each comprised of a material B having a coefficient of thermal expansion $E_B$. At elevated temperatures the vessel wall will also undergo thermal expansion, expanding radially from the center line of the vessel. Accordingly, it is also necessary to take into account the coefficient of thermal expansion $E_v$ of the vessel wall, since the supply pipe is rigidly fixed to the vessel wall and movement of the vessel wall will also affect the alignment of the back flush manifold pipe.

At room temperature, $T_o$, the following relationship is valid:

$$R = L - d \qquad \text{(Equation 1)}.$$

When the high temperature combustion gas is vented into the vessel and through the filter assembly, the temperature of the tubesheet 23, back flush manifold pipe 45 and supply pipe 53 will increase by an amount $\Delta T$ to correspond to the temperature of the combustion gas. The temperature of the carbon steel sheath 17 of vessel wall 15 will increase by a smaller amount $\Delta T_v$ due to the insulating effect of the refractory inner lining 19. Accordingly, when the high temperature combustion gases are vented through the vessel, the length L of the supply pipe will grow by an amount $LE_A\Delta T$; the overhang distance d will grow by an amount $dE_B\Delta T$; and the radius R of the vessel will grow by an amount $RE_v\Delta T_v$. Accordingly, at elevated temperatures the relationship of Equation 1 may be expressed as follows:

$$R + RE_v\Delta T_v = L + LE_A\Delta T - d - dE_B\Delta T \qquad \text{(Equation 2)}$$

Equation 2 simplifies to:

$$LE_A\Delta T = RE_v\Delta T_v + dE_B\Delta T \qquad \text{(Equation 3)}$$

Substituting equation 1 into Equation 2 and solving for d results in the following relationship:

$$d = \frac{R\left(E_A - E_v \frac{\Delta T_v}{\Delta T}\right)}{E_B - E_A}$$ (Equation 4)

The ratio $\Delta T_v/\Delta T$ can be treated as a dimensionless constant for a range of operating temperatures of hundreds of degrees with negligible error. Accordingly, the distance d that the supply pipe will extend past the vessel center line will be substantially independent of the actual operating temperature.

As may be appreciated from Equation 4, it is thus possible to select materials A and B having appropriate coefficients of thermal expansion such that the distance d will be set to maintain the correct alignment between the orifices 47 of pipe 45 with respect to the openings 35 of the filter elements 29 in tube sheet 23.

It should be noted that in the arrangement of FIGS. 1 and 2, the overhang distance d can never exceed the radius R of the vessel. Thus, the materials must be selected so that their coefficients of thermal expansion are such that for a given vessel with a fixed radius R, the overhang distance d is less than R.

As an example, consider a refractory lined carbon steel vessel per ASTM specification A-515, GR70. An operating temperature of 699° C. leads to an insulated vessel wall temperature of 121° C. when the ambient temperature is 21° C. If the tube sheet and back flush manifold pipe are made of Ni-Cr-Fe-Si Alloy 333 and the supply pipe is made of Titanium per ASTM specification B-337, Gr1, the mean coefficient of thermal expansion of the materials are as follows:

| Temperature | $E_A$* (Supply Pipe) | $E_B$* (Orifice Manifold) | $E_v$* (Vessel) |
|---|---|---|---|
| 121° C. | — | — | 11.6 |
| 899° C. | 9.9 | 17.28 | — |

*($\times 10^{-6}$ cm/cm °C.)

If it is assumed that the vessel has a diameter of 254 cm so that R=127 cm, the extension of the supply pipe past the center line of the vessel at operating temperature is:

$$d = \frac{127 \text{ cm} \times (9.9 - 11.6 \, (82°/860°))}{17.28 - 99} = 148.49 \text{ cm.}$$

In this example the coefficients of thermal expansion combined with the operating temperature, result in a value for d which exceeds the radius of the vessel. Since it is not possible to extend the supply pipe past the center line of the vessel by an amount greater than the radius of the vessel, the arrangement of FIG. 1 would not work under the circumstances of this example. However, it is possible to construct an arrangement incorporating the principles of the invention which is equivalent to FIG. 1 and which would work under the circumstances of the foregoing example.

Figure 4:
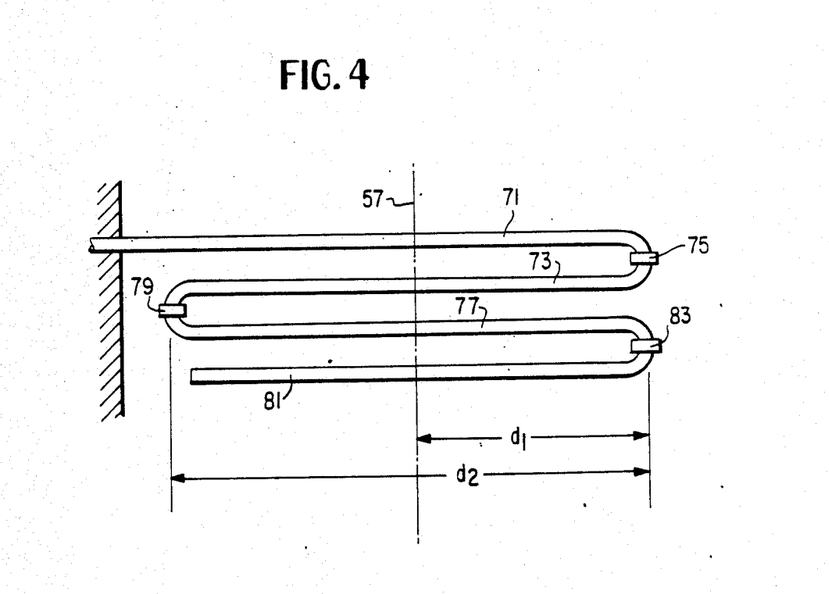
FIG. 4 is a schematic of an axial cross sectional view of a vessel and back flush manifold assembly according to another embodiment of the invention.

Reference is made to FIG. 4 which is a simplified schematic of such an equivalent arrangement wherein a first length 71 of supply pipe, composed of material A having a coefficient of thermal expansion $E_A$, is connected at one end to the vessel wall and at the other end extends past the center line 57 by an amount $d_1$. A second length 73 of supply pipe is connected via suitable pipe coupling 75 to the far right-hand end of the first length 71 as shown in FIG. 4 and extends back toward the vessel wall by a length $d_2$. Second length 73 is made of material B having a coefficient of thermal expansion $E_B$ the same as the tubesheet. A third length 77 of supply pipe is connected to the far left-hand end of second length 73 as shown in FIG. 4 via a suitable pipe coupling 79. Third length 77 is also made of material A. A back flush manifold pipe 81 made of material B and having orifices therein (not shown) which are arranged to be in alignment with the outlets of filter elements as shown in FIG. 1, is connected to the far right-hand end as shown in FIG. 4 of the third length 77 of supply via a suitable pipe coupling 83.

The sum of the lengths $d_1$ and $d_2$ is the equivalent of the overhang distance d of FIG. 1. That is, both lengths 71 and 77 which are each of material A are thermally expanding away from the anchor point at the vessel wall and the length 73 and the back flush manifold pipe 81, which are each of material B, are thermally expanding toward the left in FIG. 4. The distance $d_1$ of length 71 plus the distance $d_2$ of length 77 comprise the overhang distance of the supply pipe with respect to the center line of the vessel corresponding to the length d in FIGS. 1 and 2. The supply pipe in FIG. 4 is in essence simply folded to fit within the vessel. Accordingly, an arrangement such as disclosed in FIG. 4 whereby the supply pipe is folded may be employed where the coefficients of thermal expansion of the materials and the dimensions of the vessel dictate a dimension d which is larger than the radius of the vessel.

The embodiments of FIGS. 1 and 4 are merely two examples of a back flush manifold assembly including a supply pipe and a back flush manifold pipe which incorporate the principles of the invention. Other configurations incorporating the principles of the invention are possible. For example it is possible to select materials such that the overhang distance d of FIG. 1 is negative, meaning that the point of attachment of the supply pipe 53 to the back flush manifold pipe 45 is to the left of the vessel centerline 57. The idea of the invention is to utilize the coefficients of expansion of different lengths of material connected in a manner so as to shift the effective anchoring point of a member so that the member appears to be expanding uniformly radially outwardly from a desired longitudinal axis, rather than its actual anchoring point.

It will be understood that the above description of the present invention is susceptible to various modifications, changes and adaptations, and the same are intended to be comprehended within the meaning and range of equivalents of the appended claims.

I claim:

1. A thermal expansion compensating arrangement comprising:
   a vessel having a longitudinal axis;
   a first member disposed in said vessel, intersecting the longitudinal axis and made of a material having a first coefficient of thermal expansion causing said first member to thermally expand along a given direction transverse to the longitudinal axis upon an increase in temperature;
   anchoring means for anchoring said first member to said vessel so that said first member can thermally expand uniformly radially outwardly from said longitudinal axis in the given direction;

a second member having a desired alignment in the given direction relative to said first member at a base temperature, said second member being made of the same material as said first member, said second member thermally expanding along the given direction upon an increase in temperature; and an anchoring arm of selected length for anchoring said second member to said vessel, said anchoring arm having one end which forms a rigid connection with said vessel and another end which forms a rigid connection with said second member, said anchoring arm being made of material having a second coefficient of thermal expansion for causing said anchoring arm to expand along the given direction upon an increase in temperature, said anchoring arm thermally expanding away from its rigid comnection with said vessel and said second member thermally expanding away from the rigid connection with said anchoring arm, the material for said first and second members and the material for and length of said anchoring arm being selected based upon a predetermined relationship of the length of the anchoring arm with the first and second coefficients of thermal expansion for causing the thermal expansion of said anchoring arm to compensate for the thermal expansion of said second member to produce an effective anchoring point of said second member which is coincident with the longitudinal axis of the vessel so that upon an increase in temperature above the base temperature said second member will thermally expand uniformly radially outwardly from the longitudinal axis to thereby maintain the desired alignment with said first member.

2. An arrangement according to claim 1, wherein said anchoring arm comprises an elongated arm having no 180° bends between its connection with said vessel and its connection with said second member.

3. An arrangement according to claim 1, wherein said anchoring arm comprises a plurality of elongated portions which are connected end to end and are folded over one another in the form of a coil.

4. An arrangement according to claim 1, wherein said anchoring arm comprises at least first, second and third elongated portions each having first and second opposite ends, the first opposite end of said first portion constituting said one end connected to said vessel, said first portion extending from said one end inwardly of said vessel and having its second opposite end connected to the first opposite end of said second portion, said second portion extending from its first end back towards the first end of said first portion, said second portion having its second opposite end connected to the first opposite end of said third portion, said third portion extending from its first opposite end back towards the second opposite end of said first portion, the second opposite end of said third portion constituting the other end of said anchoring arm which is connected to said second member.

5. An arrangement according to claim 4, wherein said first and third portions have the same coefficient of thermal expansion.

6. An arrangement according to claim 5, wherein said second portion and said second member have the same coefficient of thermal expansion.

7. An arrangement according to claim 1, wherein said vessel is made of a material having a third coefficient of thermal expansion causing said vessel to thermally expand radially outwardly from the longitudinal axis upon an increase in temperature, and the materials for said first and second members and the material for and length of said anchoring arm are selected based upon a predetermined relationship of the length of the anchoring arm with the first, second and third coefficients of thermal expansion to maintain the effective anchoring point of said second member coincident with the longitudinal axis.

8. An arrangement according to claim 1, wherein said vessel has a circular cross section, is made of material having a third coefficient of thermal expansion and the longitudinal axls is the central longitudinal axis of said vessel, said vessel has a radius R, said anchoring arm extends beyond the central longitudinal axis by an effective distance d before it is connected to said second member, said second member has a length L in the given direction, and the coefficients of thermal expansion are selected to satisfy the following relationship:

$$d = \frac{R\left(E_A - E_V \frac{\Delta T_V}{\Delta T}\right)}{E_B - E_A} \text{ wherein:}$$

$E_A$ = first coefficient of thermal expansion;
$E_B$ = second coefficient of thermal expansion;
$E_V$ = third coefficient of thermal expansion;
$\Delta T_V$ = temperature increase of vessel relative to the base temperature; and
$\Delta T$ = temperature increase of first and second members and anchoring arm relative to the base temperature.

9. A high temperature gas filtration system incorporating compensation for thermal expansion in the system, comprising:

a vessel having a longitudinal axis, an inlet for receiving high temperature gases containing particulates, and a filtered gas outlet;

a filter assembly disposed between said inlet and said outlet for filtering particulates out of the gas, said filter assembly including a plate disposed transverse to and intersecting the longitudinal axis, said plate being made of a material having a first coefficient of thermal expansion and having a plurality of openings, filter elements mounted in the openings, and a flexible support surrounding said plate and connecting said plate to the vessel, said flexible support permitting said plate to thermally expand uniformly radially outwardly from the longitudinal axis upon an increase in temperature; and a back flush manifold assembly mounted for back flushing a gas through the openings in said plate for back flushing particulates out of said filter elements, the back flush manifold assembly including a back flush manifold pipe disposed over said plate, made of the same material as said plate and having a plurality of back flush orifices each having a desired alignment over a respective one of the openings in said plate for directing a back flush gas into such openings, and a gas supply pipe having a selected length and being connected for delivering back flush gas to said back flush manifold pipe, the longitudinal axis intersecting the back flush manifold pipe at a given point at a base temperature, said gas supply pipe having one end forming a rigid connection with said vessel and another end forming a rigid connection with said back flush manifold pipe, said gas supply pipe being made of a material having a second coefficient of thermal expansion, said gas supply pipe thermally expanding away from said one end and said back flush manifold pipe thermally expanding from its connection with said gas supply pipe upon an increase in temperature, the material for said plate and said back flush manifold pipe and the material for and length of said gas supply pipe being selected based upon a predetermined relationship of the length of the gas supply pipe with the first and second coefficients of thermal expansion for causing the thermal expansion of said gas supply pipe to compensate for thermal expansion of said back flush manifold pipe so that upon an increase in temperature from the base temperature the given point at the back flush manifold pipe remains coincident with the longitudinal axis, whereby said back flush manifold pipe thermally expands uniformly radially from the longitudinal axis to maintain the desired alignment of the back flush orifices with the openings in said plate.

10. An arrangement according to claim 9 wherein said gas supply pipe comprises an elongated arm having no 180° bends between its connection with said vessel and its connection with said back flush manifold pipe.

11. An arrangement according to claim 9, wherein said gas supply pipe comprises a plurality of elongated pipe portions which are connected end to end and are folded over one another in the form of a coil.

12. An arrangement according to claim 9, wherein said gas supply pipe comprises at least first, second and third elongated pipe portions each having first and second opposite ends, the first opposite end of said first pipe portion constituting said one end connected to said vessel, said first pipe portion extending from said one end inwardly of said vessel and having its second opposite end connected to the first opposite end of said second pipe portion, said second pipe portion extending from its first end back towards the first end of said first pipe portion, said second pipe portion having its second opposite end connected to the first opposite end of said third pipe portion, said third pipe portion extending from its first opposite end back towards the second opposite end of said first pipe portion, the second opposite end of said third pipe portion constituting the other end of said gas supply pipe which is connected to said back flush manifold pipe.

13. An arrangement according to claim 12, wherein said first and third pipe portions have the same coefficient of thermal expansion.

14. An arrangement according to claim 9, wherein said second pipe portion and said back flush manifold pipe have the same coefficient of thermal expansion.

15. An arrangement according to claim 9, wherein said vessel is made of a material having a third coefficient of thermal expansion causing said vessel to thermally expand radially outwardly from the longitudinal axis, and the material for said plate and said back flush manifold pipe and the material for and length of said gas supply pipe are selected based upon a predetermined relationship of the length of the gas supply pipe with the first, second and third coefficients of thermal expansion to maintain the given point of said back flush manifold pipe coincident with the longitudinal axis upon an increase in temperature.

16. An arrangement according to claim 9, wherein said vessel has a circular cross section, is made of material having a third coefficient of thermal expansion and the longitudinal axis is the central longitudinal axis of said vessel, said vessel has a radius R, said gas supply pipe extends beyond the central longitudinal axis by an effective distance d before it is connected to said back flush manifold pipe, said back flush manifold pipe has a length L, and the coefficients of thermal expansion are selected to satisfy the following relationship:

$$d = \frac{R\left(E_A - E_v \frac{\Delta T_v}{\Delta T}\right)}{E_B - E_A} \text{ wherein:}$$

$E_A$ = first coefficient of thermal expansion;
$E_B$ = second coefficient of thermal expansion;
$E_v$ = third coefficient of thermal expansion;
$\Delta T_v$ = temperature increase of vessel relative to the base temperature; and
$\Delta T$ = temperature increase of plate, back flush manifold pipe, and gas supply pipe relative to the base temperature.

17. A thermal expansion compensating arrangement, comprising:
a supporting body having a longitudinal axis;
a member made of a material having a first coefficient of thermal expansion for causing said member to thermally expand along a given direction upon an increase in temperature; and
an anchoring arm made of a material having a second coefficient of thermal expansion, said anchoring arm having one end forming a rigid connection with said supporting body and another end forming a rigid connection with said member, the longitudinal axis being perpendicular to both said anchoring arm and said member and intersecting said member at a given point at a base temperature, and the materials for said member and said anchoring arm and the length of said anchoring arm being selected based upon a predetermined relationship of the length of the anchoring arm with the first and second coefficients of thermal expansion for maintaining the intersection of the longitudidal axis with said member at the given point upon an increase in temperature above the base temperature.

18. A method for compensating for thermal expansion of first and second members mounted in a vessel having a longitudinal axis to maintain a desired alignment of the first member relative to the second member in a given direction of thermal expansion transverse to the longitudinal axis upon an increase in temperature within the vessel, where the members are made of the same material having a first coefficient of thermal expansion in the given direction and the first member is anchored to the vessel so that it thermally expands uniformly radially outwardly from the longitudinal axis of the vessel upon an increase in temperature from a base temperature, the longitudinal axis intersecting the second member at a given point at the base temperature, said method comprising:
providing an anchoring arm having one end rigidly connected to the vessel and another end rigidly connected to the second member, the anchoring arm having a selected length and being made of a material having a second coefficient of thermal expansion; and selecting the material for the first and second members and the material for and length of the anchoring arm based upon a predetermined relationship of the length of the anchoring arm with the first and second coefficients of thermal expansion for creating an effective anchoring point of the second member at the given point so that thermal expansion of the second member occurs uniformly radially outwardly from the longitudinal axis upon an increase in temperature, thereby maintaining the desired alignment with the first member.

19. A method for compensating for thermal expansion of a member rigidly connected to one end of an anchoring arm, the anchoring arm having another end rigidly connected to a supporting body, for maintaining a constant alignment of the member relative to a longitudinal axis which is perpendicular to the member and the anchoring arm and intersects a given point of the member, the member and anchoring arm being made of materials having first and second coefficients of thermal expansion, respectively, said method comprising:

selecting the materials of the member and the anchoring arm and the length of the anchoring arm based upon a predetermined relationship of the length of the anchoring arm with the first and second coefficients of thermal expansion so that, upon an increase in temperature, the member will thermally expand from its connection with the anchoring arm toward the connection of the anchoring arm with the supporting body and the anchoring arm will thermally expand away from its connection with the supporting body to maintain the point at which the longitudinal axis intersects the member coincident with the given point of the member.

* * * * *